May 7, 1935.  B. KELLEY  2,000,137
PRESSURE FILTER
Filed Aug. 19, 1931  3 Sheets-Sheet 2
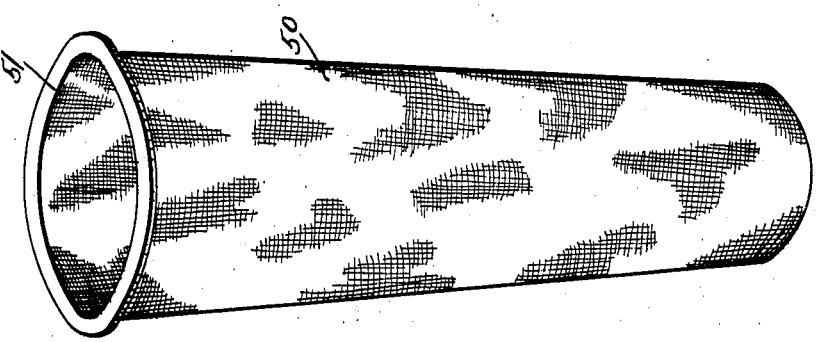
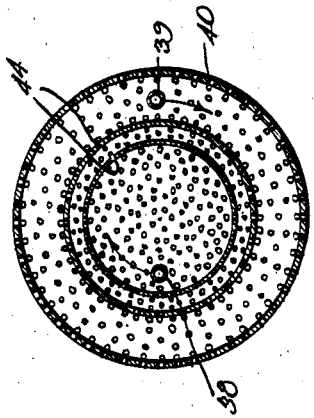
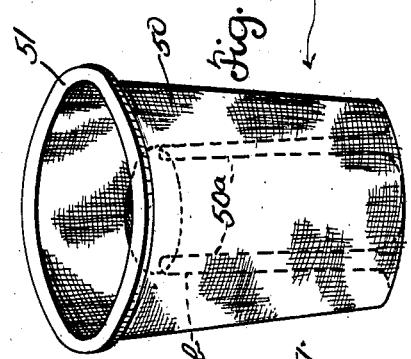
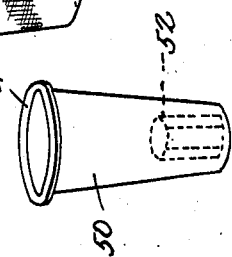
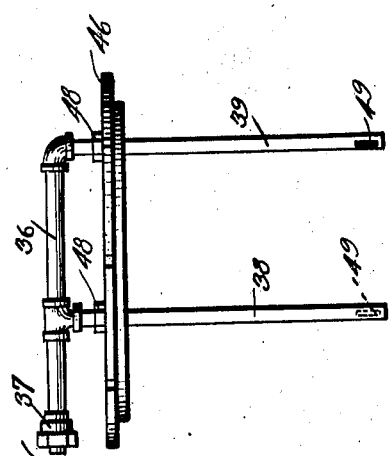
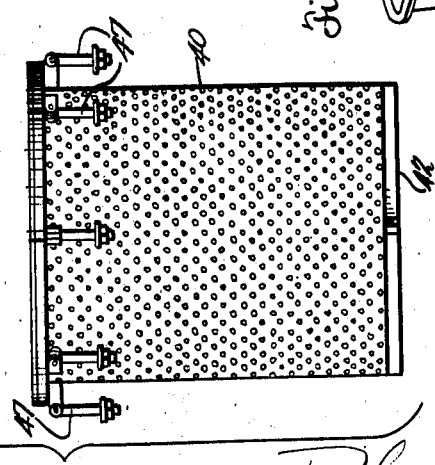
Inventor
Blaine Kelley
By Ryatt Lowry
Attorneys

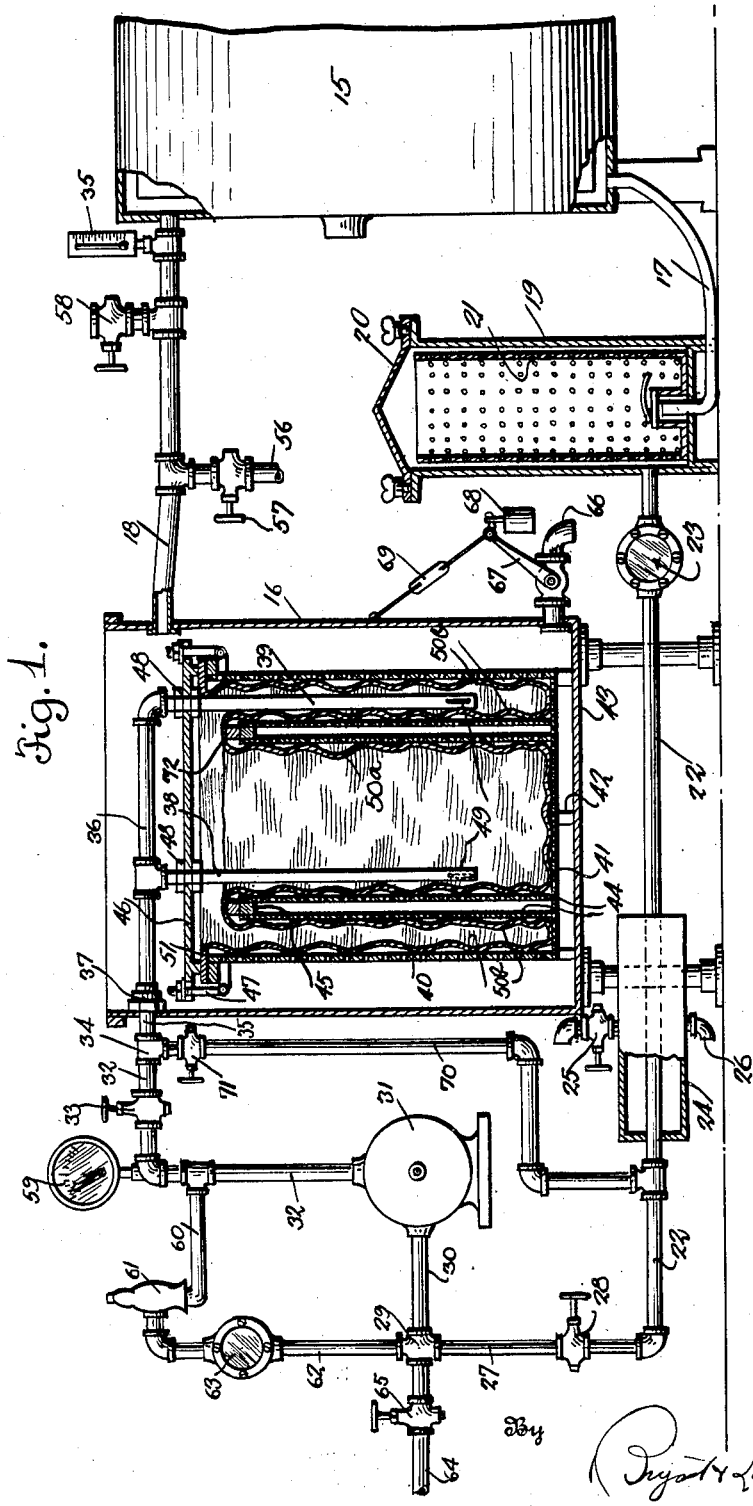

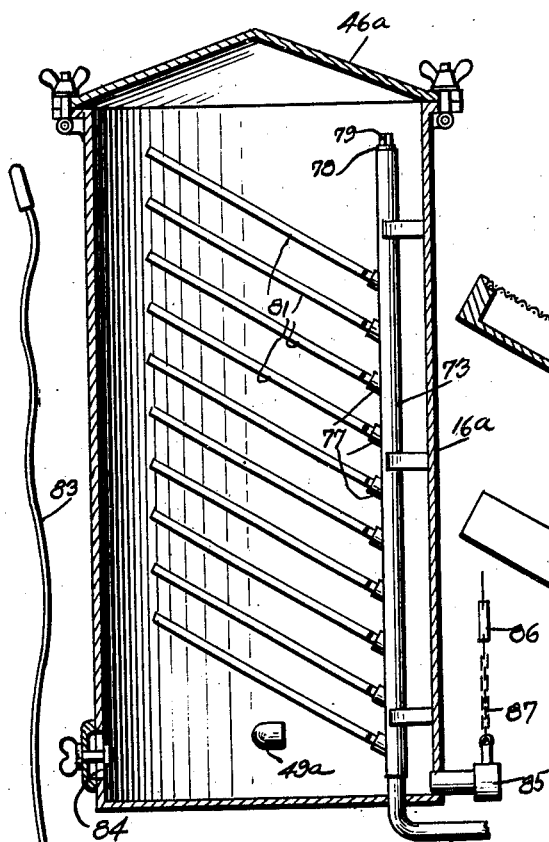
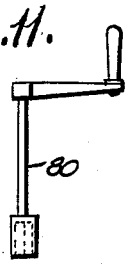
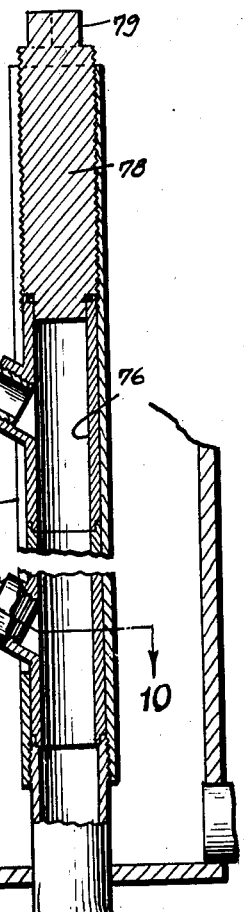
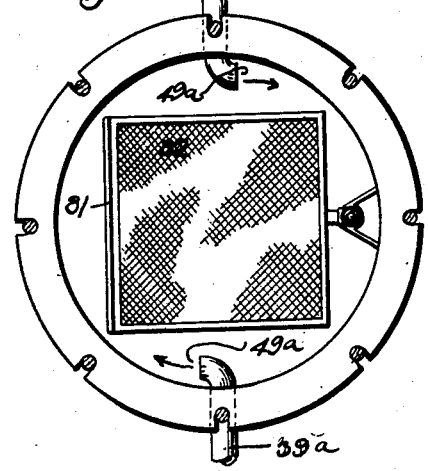

Patented May 7, 1935

2,000,137

UNITED STATES PATENT OFFICE 2,000,137

PRESSURE FILTER

Blaine Kelley, Charlotte, N. C.

Application August 19, 1931, Serial No. 558,179

14 Claims. (Cl. 210—183)

This invention relates to certain new and useful improvements in pressure filters.

While the pressure filter disclosed herein may be used in various industries and arts, the same is primarily intended for use in the dry cleaning industry and an object thereof is to clean the fluid solvent, such as gasoline, for the removal of dirt, lint, and other foreign matter therefrom, to return the solvent to the cleaning or washing apparatus in a crystal clear condition.

A further object of the invention is to provide a pressure filter wherein a filter tank is in valve controlled pipe communication with washing apparatus, with a fabric filter basket removably mounted in the filter receptacle with the filter basket of cylindrical formation, opened at its upper end and closed at its lower end and telescopically folded with the side walls thereof spaced from each other to increase the percolating or straining areas of a relatively large filter bakset in a restricted area to obtain maximum filtration of the solvent.

A further and important object of the invention, is to discharge the dirty solvent into the filter basket tangentially to cause the same to be moved in a swirling circular path for even distribution on the surfaces of the filter bag of the foreign matter and cleaning powder usually added to the solvent for the even formation of a coacting or cake on the walls of the filter bag so that the solvent escapes through the bag over the entire area thereof in a crystal clear condition for returning to the washing apparatus, the cake formation being of a porous character permitting the flow of solvent therethrough with the results that pressure is extremely slow in building up in the filter receptacle so that the operator may wait for a longer period of time without loss of time in frequent change or cleaning of the bag.

Another object of the invention is to provide a pressure filter wherein the solvent to be cleaned or filtered is delivered to a tank or receptacle in a manner to create a swirling motion in the receptacle with means intercepting the outlets from the receptacle to delete foreign matter from the solvent so that the latter issues from the receptacle in a crystal clear condition.

With the above and other objects in view that will become apparent as the nature of the invention is better understood, the same consists in the novel form, combination and arrangement of parts hereinafter more fully described, shown in the accompanying drawings and claimed.

In the accompanying drawings:

Figure 1 is a fragmentary side elevational view, partly in vertical longitudinal sections, of a dry cleaning system with a pressure filter in communication with washing apparatus, Figure 2 shows a side elevational view of the screen container and cover that houses a filter bag, Figure 3 is a horizontal sectional view of the screen container, Figure 4 is a perspective view of the filter bag in extended position, Figure 5 is a perspective view on a reduced scale of the filter bag, with a device illustrated therein by dotted lines to cause the bag to assume a telescopic folded position when placed in the screen container, Figure 6 is a perspective view of the filter bag in folded telescopic position, Figure 7 is a vertical longitudinal sectional view of another form of pressure filter showing screening trays supported by an outlet pipe from the filter, Figure 8 is a top plan view of the filter shown in Figure 7 with cover removed, Figure 9 is an enlarged detailed sectional view showing the screening trays supported on the outlet pipe, Figure 10 is a detailed sectional view taken on lines 10—10 of Figure 9, Figure 11 is a side elevational view of the wrench device for removing the retaining plug from the outlet pipe to permit removal of the screening trays, and to bodily remove the filter unit; and Figure 12 is a side elevational view of the cleaning tool for the screening trays.

Referring more in detail to the accompanying drawings and particularly to Figures 1 to 6, there is illustrated a dry cleaning assembly including a washer 15 and a filter receptacle 16. The dirty solvent from the washer 15 outlets at the lower end thereof through the pipe 17 and after passing through several cleaning stags, the same is discharged into the receptacle 16 of the pressure filter for return to the upper end of the washer 15 by way of the return pipe line 18. The apparatus will be described by following the path of flow of the solvent, the solvent outletting from the bottom of the washer 15 by way of the pipe 17 entering a trap 19 with a removable cover 20 to facilitate the cleaning, the trap 19 having a screen cylinder 21 therein to effect the removal of any particles of foreign matter in the solvent. Solvent from the trap 19 flows through the pipe 22 that contains a sight glass 23 permitting observation of the solvent and said pipe 22 extends through a heater box 24 for breaking up any heavier particles of foreign matter that may escape the trap 19, a heating medium for the box 24 being supplied thereto from a suitable source under the control of the valve 25 and outletting at the lower end of the box as at 26. The pipe 22 outwardly of the heater box 24 carries an angle extension 27 with a control valve 28 therein, the extension 27 being connected to a fitting 29 that has a pipe connection 30 with a compressor pump 31. The outlet pipe 32 from the pump 31 carries an angle pipe extension 32 with a control valve 33 set therein, the pipe 32 being connected to a fitting 34 for purposes presently to be described and said fitting 34 has a pipe section 35 extending through the side walls of the filter receptacle 16 adjacent its upper end. The pipe section 36 has a union connection 37 with the pipe section 35 being located within the receptacle 16, the pipe section 36 carrying depending branch pipes 38 and 39 that extend downwardly into compartments of a filter bag contained in a screening chamber housed within the receptacle 16.

The screening chamber is a cylindrical formation and comprises an outer perforated wall 40 carried by a bottom wall 41 provided with feet 42 for elevating the bottom wall of the screening chamber from the bottom wall 43 of the receptacle 16. The screening chamber has a pair of concentric spaced inwardly disposed walls 44 rising from the bottom wall 41 in spaced relation with the outer wall 40 and are closed at their upper ends by a ring 45. The screening chamber is provided with a removable cover wall 46 retained in closed position upon the upper end of the chamber by a plurality of pivoted screw lugs 47 and the depending outlet pipes 38 and 39 are secured as at 48 to the cover 46 to be movable with the cover when the screws 47 are released and the union 37 is operated to disconnect the pipe section 36 from the pipe section 35 as illustrated in Figure 2. The depending pipe 38 enters the central compartment of the screening chamber inwardly of the double wall construction 44 while the depending pipe 39 enters the screening chamber between the outer wall 40 and the adjacent central wall 44 as illustrated in Figures 1 and 3, lateral outlets 49 in the lower ends of the depending pipes 38 and 39 opening in opposite directions to create a swirling motion of the solvent within the screening chamber.

A filter bag is adapted to be placed in the screen chamber in a telescopic folded condition as illustrated in Figure 1, the bag 50 shown in Figures 4 to 6 carrying a ring flange 51 at its open end to be supported upon the upper end of the screening chamber and retained in position by the chamber cover 46, the sides being telescopically folded with the aid of the form or weight device 52 shown in Figure 5 into the positions shown in Figures 1 and 6, the lower end of the bag 50 being received in the central compartment of the screening chamber inwardly of the double walls 44 while the telescopic fold depends into the annular space of the screening chamber between the wall 40 and the adjacent double wall 44, the inner section of the bag being shown at 50ª and the double fold portion at 50ᵇ in Figure 1, the depending pipe 38 entering the central portion of the bag while the depending pipe 39 is positioned between the double folds 50ᵇ. When the bag is completely positioned within the screening chamber, the form 52 is removed from the inner closed end of the bag 50 and the cover 46 for the screening chamber is engaged with the upper end thereof.

In the operation of the apparatus, dirty solvent from the washer 15 outlets through the pipe 17 at the lower end thereof and enters the screened trap 19, the solvent flowing therefrom through the pipe 22, the character thereof being observed through the sight glass 23, the solvent being heated by the heater 24 inclosing a portion of the pipe 22 before entering the pump 31 by way of the pipe sections 27 and 30. The solvent is forced by the pump 31 through the pipe sections 32 and 35 to enter the pipe section 36 supported upon the cover 46 of the screening chamber to descend downwardly through the pipes 38 and 39 into different sections of the filter bag within the screening chamber and discharged into the filter bag in a swirling circular motion by the lateral outlets 49 in the lower ends of the pipes 38 and 39. The mixture of filter powder and cleaning solvent enters the filter bag, the solvent passing through the bag and leaving a coating on the inner walls thereof known as a filter coat. Upon the formation of the filter coat, the solvent flows therethrough and enters the receptacle 16 in a clear condition. The swirling action of the mixture of filter powder and solvent causes dirt and other foreign matter in the solvent to be evenly distributed over the walls of the bag for the formation of the filter cake that is of a porous characteristic to permit the passage of solvent therethrough. The solvent in a clean and clear condition rises in the receptacle 16 and overflows through the pipe 18 for return to the washer 15, the pipe 18 being provided with a thermometer 55 for determining the heat condition of the cleaned solvent. If desired, a portion or all of the solvent returning through the pipe 18, may be diverted to the pipe 56 on the control of the valve 57 for delivery to a chemical treating tank or distilling apparatus while the washer is still in operation for refreshing the solvent which is returned through the pipe 18 for discharge into the washer 15 by way of a pipe leading to the valve connection 58. As shown in Figure 1, a pressure gauge 59 is carried by the pipe 32 for determining the pressure in the filter chamber so that an operator may know when the cleaning or changing of the filter bag is necessary. To prevent overpressure in the filter chamber, there is provided a pipe extension 60 from the pipe 32 that has a pressure release valve 61 set therein, that is opened in the presence of pressure to permit passing of the solvent through the pipe 62 adapted to the fitting 29 for return to the pump 31 by way of the pipe 30, the pipe 62 having a sight glass 63 therein for observing the condition of the solvent. When it is necessary to replace the filter bag with a clean one, it being understood that the bag is completely filled with dirty solvent as the return pipe 18 is above the screening chamber 40, a source of air supply has a pipe connection 64 with a fitting 29 on the control of the valve 65, the air entering the pump 31 to be discharged into the bag by way of the pipes 38 and 39 for driving the solvent through the filter 30 with the solvent emerging therefrom in a cleaned condition. When the bag has been completely emptied of liquid solvent and the receptacle 16 filled to the level of the return pipe 18, the drain valve 66 carried by the lower end of the receptacle 16 may be opened and the solvent contained in the receptacle 16 drained therefrom. The valve 66 is of a safety character to be automatically opened in the presence of excessive heat conditions or fire, the valve 66 including an operating handle 67 weighted as at 68 for automatic operation and retained in its closed position by a cord or cable including a link 69. Solvent remaining in the bag may also be withdrawn therefrom by syphonic action by the pipe 70 attached to the fitting 34 having a control valve 71 therein with the pipe 70 attached to the pipe 22. To remove the bag 50 from the screening chamber, the union 37 is disengaged from the pipe section 35 and the screw pins 47 disengaged from the cover 46 whereupon the cover together with the pipe section 36 on depending pipes 38 and 39 are elevated from the screening chamber. It has been found that the filter bag may be more easily removed from the screening chamber by placing a ring 72 as shown in Figure 1 upon the upper ends of the double walls 44 between a telescopic fold of the bag. The dirty filter bag is then removed for cleaning and replacement in a minimum of time so that the apparatus operates practically uninterruptedly. When passage of the solvent through the filter bag is retarded by the excess formation of the cake upon the walls of the bag, this condition is registered by back pressure on the pressure gauge 59 and is a telltale that the bag needs cleaning or replacement. In pressure filters having a filter bag with a filter cake formed thereon, it frequently occurs that the filter cake collapses when the filter is out of service and with the flow of solvent in a downward direction, the collapsed cake becomes packed in the bottom of the bag by the downward pressure of the solvent and such collapsed cake is lost so far as re-distribution thereof for the reformation of a filter cake is concerned. Also, if the speed is in a direct upward path, the reformation of a collapsed filter cake on the walls of a bag could not be successfully accomplished as the same would be re-distributed in an uneven and streaky manner. It is therefore essential that the solvent be delivered to the lower end of the filter bag in a manner to cause upward whirling motion thereof for the initial formation of a filter cake evenly upon the walls of the filter bag and in the event of rebuilding a collapsed filter cake, the upward whirling motion of the solvent evenly redistributes the filter cake over the walls of the bag. Therefore, the gist of this invention embodies the upward whirling motion imparted to the solvent or other fluid for the formation of the filter cake on the walls of a filter bag, this upward whirling motion being particularly effective in the presence of collapsed filter cakes.

It will be understood that by introducing the polluted liquid in a substantially horizontal direction and tangentially with reference to the walls of the liquid chamber, the liquid is thereby caused to swirl within the chamber and to move upwardly therein and in paths substantially parallel to the upright walls of the chamber.

The same principal of operation is embodied in the form of the invention illustrated in Figures 7 to 12, the reference character 16ᵃ indicating a receptacle having a removable cover 46ᵃ and diametrically opposite inlet pipes 38ᵃ and 39ᵃ adjacent the lower end of the receptacle 16ᵃ with a discharged end 49ᵃ angularly directed causing a circular swirling action of the solvent discharged into the receptacle 16ᵃ. A stand pipe 73 perpendicularly rises in the receptacle 16ᵃ and has an outlet pipe 74 at its lower end for the return of clean solvent to the washer. One side of the stand pipe 73 is longitudinally slotted as at 75 and tribular pipe sections 76 slidably mounted in the stand pipe 73 have angle nipples 77 projecting therefrom through the side slots 75 of the stand pipe, the several pipe sections 76 being arranged in superposed contacting relations and retained in the stand pipe against the movement by the screw plug 78 threaded into the upper end of the stand pipe with a wrench end 79 upon its upper end to be engaged by the wrench 80 as shown in Figure 11. Each nipple 77 carries a screening tray 81 having a filter screen cover 82 as shown in Figures 8 and 9, the dirty filtering through the screen 82 and being delivered by the trays 81 to the stand pipe 73 and the return pipe 74. The screen 82 may be cleaned by the flexible cleaning rod 83 shown in Figure 7 while the receptacle 16ᵃ is made accessible for cleaning purposes by the manhole opening and cover 84. A drain valve 85 is provided in the lower end of the receptacle 16ᵃ and said valve 85 may be automatically opened in the presence of excessive heat conditions or fire by the melting of the fusible link 86 having a chain connection 87 therewith.

From the above detailed description of the invention, it is believed that the construction and operation thereof will at once be apparent, and while there are herein shown the preferred embodiments of the invention, it is to be understood that minor changes may be made therein such as will fall within the scope of the invention as claimed.

What I claim as new is:—

1. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake from the bottom upwards on the walls of the bag, the pressure filter including a receptacle and a screen chamber in the receptacle for supporting the bag with the solvent delivering means extending downwardly between the folds of the bag.

2. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake from the bottom upwards on the walls of the bag, the pressure filter including a receptacle and a screen chamber in the receptacle for supporting the bag, the screen chamber having an outer wall and a pair of spaced concentric inner walls with the filter bag supported by the walls with the solvent delivering means extending downwardly between the folds of the bag.

3. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake from the bottom upwards on the walls of the bag, the pressure filter including a receptacle and a screen chamber in the receptacle for supporting the bag, the screen chamber having an outer wall and a pair of spaced concentric inner walls, and said filter bag being telescopically folded to inclose the inner spaced walls of the screen chamber and be adjacent the outer wall of the chamber with the solvent delivering means extending downwardly between the folds of the bag.

4. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake from the bottom upwards on the walls of the bag, the pressure filter including a receptacle and a screen chamber in the receptacle for supporting the bag, the screen chamber having an outer wall and a pair of spaced concentric inner walls, and said filter bag being telescopically folded to inclose the inner spaced walls of the screen chamber and be adjacent the outer wall of the chamber, with the folded walls of the bag spaced from each other with the solvent delivering means extending downwardly between the folds of the bag.

5. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake on the walls of the bag, the pressure filter including a receptacle and a screen chamber in the receptacle for supporting the bag, the screen chamber having an outer wall and a pair of spaced concentric inner walls with the filter bag supported by the walls, the solvent delivering means including a pipe extending across the upper end of the filter bag, discharge pipes depending therefrom into spaces between the folds of the bag with lateral outlets at the lower ends to promote the swirling action of the solvent.

6. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake on the walls of the bag, the pressure filter including a receptacle and a screen chamber in the receptacle for supporting the bag, the screen chamber having an outer wall and a pair of spaced concentric inner walls, and said filter bag being telescopically folded to inclose the inner spaced walls of the screen chamber and be adjacent the outer wall of the chamber, the solvent delivering means including a pipe extending across the upper end of the filter bag, discharge pipes depending therefrom into spaces between the folds of the bag with lateral outlets at the lower ends to promote the swirling action of the solvent.

7. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake on the walls of the bag, the pressure filter including a receptacle and a screen chamber in the receptacle for supporting the bag, the screen chamber having an outer wall and a pair of spaced concentric inner walls, and said filter bag being telescopically folded to inclose the inner spaced walls of the screen chamber and be adjacent the outer wall of the chamber, with the folded walls of the bag spaced from each other, the solvent delivering means including a pipe extending across the upper end of the filter bag, discharge pipes depending therefrom into spaces between the folds of the bag with lateral outlets at the lower ends to promote the swirling action of the solvent.

8. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake on the walls of the bag, the pressure filter including a receptacle and a screen chamber in the receptacle for supporting the bag, the screen chamber having an outer wall and a pair of spaced concentric inner walls, and said filter bag being telescopically folded to inclose the inner spaced walls of the screen chamber and be adjacent the outer wall of the chamber, the solvent delivering means including a pipe extending across the upper end of the filter bag, discharge pipes depending therefrom into spaces between the folds of the bag with lateral outlets at the lower ends to promote the swirling action of the solvent, means for forcing a current of air through the screen chamber and a safety drain valve in the lower end of the receptacle.

9. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake on the walls of the bag, the pressure filter including a receptacle and a screen chamber in the receptacle for supporting the bag, the screen chamber having an outer wall and a pair of spaced concentric inner walls, and said filter bag being telescopically folded to inclose the inner spaced walls of the screen chamber and be adjacent the outer wall of the chamber, with the folded walls of the bag spaced from each other, the solvent delivering means including a pipe extending across the upper end of the filter bag, discharge pipes depending therefrom into spaces between the folds of the bag with lateral outlets at the lower ends to promote the swirling action of the solvent, means for forcing a current of air through the screen chamber and a safety drain valve in the lower end of the receptacle.

10. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake on the walls of the bag, the pressure filter including a receptacle and a screen chamber in the receptacle for supporting the bag, the screen chamber having an outer wall and a pair of spaced concentric inner walls, and said filter bag being telescopically folded to inclose the inner spaced walls of the screen chamber and be adjacent the outer wall of the chamber, with the folded walls of the bag spaced from each other, the solvent delivering means including a pipe extending across the upper end of the filter bag, discharge pipes depending therefrom into spaces between the folds of the bag with lateral outlets at the lower ends to promote the swirling action of the solvent, and a screened trap set into the supply pipe to the pressure filter.

11. In a pressure filter of the character described, a pressure filter having supply and outlet pipe connections, a filter bag in the filter and means for delivering solvent and filter powder to the filter bag at a point adjacent its lower end and in a swirling motion for the intimate mixture of matter foreign to the solvent and to cause the formation of a filter cake on the walls of the bag, the pressure filter including a receptacle and a screen chamber in the receptacle for supporting the bag, the screen chamber having an outer wall and a pair of spaced concentric inner walls, and said filter bag being telescopically folded to inclose the inner spaced walls of the screen chamber and be adjacent the outer wall of the chamber, with the folded walls of the bag spaced from each other, the solvent delivering means including a pipe extending across the upper end of the filter bag, discharge pipes depending therefrom into spaces between the folds of the bag with lateral outlets at the lower ends to promote the swirling action of the solvent, a removable cover for the screen chamber and a detachable connection between the cover and cross pipe.

12. The method herein described of filtering polluted solvents used in dry cleaning apparatus and the like consisting in flowing under pressure a fluid consisting of a mixture of liquid solvent and a non-buoyant insoluble filter-powder into an upright chamber whose upright reticulated wall is to be coated with said filter-powder, the mixture of solvent and filter-powder being introduced into the lower end of said chamber in a substantially horizontal direction substantially parallel to the the upright wall of the chamber to cause an upward spiral swirling movement of the intimately mixed solvent and filter-powder throughout the length and the area of the filter chamber to thereby cause the filter-powder to be evenly deposited as a filtering coating upon the entire area of the upright reticulated wall of the filter chamber and also take up and disintegrate the pieces of cake which wall from the wall and redistribute the powder upon the wall, the discharge side of the reticulated wall being kept immersed in filtered solvent during the filtering operation.

13. A pressure filter apparatus of the character described, a receptacle for receiving the filtered liquid, a pressure-filter proper enclosed in said receptacle, outlet means for said receptacle positioned and adapted to maintain a level of clean liquid in the receptacle at a point above said pressure-filter proper so as to maintain immersion thereof, said pressure-filter proper embodying a cylindrical foraminous casing and compartment-forming foraminous walls enclosed in said casing, said foraminous walls being adapted to receive and hold the filter-cake hereinafter referred to, inlet means for said pressure-filter proper extending into the lower ends of the compartments formed by the foraminous walls and foraminous casing and arranged to deliver the liquid tangentially with respect to the wall of the casing to thus cause an upward swirling of the mixture of cleaning liquid and suspended filter-powder throughout said compartments to thereby build up from the bottom a porous filtering wall on said foraminous walls throughout the area of said walls.

14. A pressure filter, a receptacle for filtered solvent having an outlet, a foraminous casing in said receptacle, a filter-bag supported in said casing, and means for delivering the fluid to be cleaned together with a powdered suspended filter-aid into the filter-bag at a point adjacent its lower end and in a direction tangential to the wall of the bag to thus cause a swirling motion of the mixture upwardly within the entire area of the filter-bag whereby the filter-aid is uniformly deposited in the form of a filter-cake upon the wall of the filter-bag throughout the area thereof and whereby also any displaced pieces of the filter-cake will be disintegrated and redistributed and redeposited upon the wall of the filter-bag.

BLAINE KELLEY.